United States Patent [19]
Cauldwell et al.

[11] 4,084,140
[45] Apr. 11, 1978

[54] PROGRAMMABLE NON-DUPLICATION SWITCHING DEVICE

[75] Inventors: Jack D. Cauldwell, Carroll; Raymond Louis Weaver, Lancaster, both of Ohio

[73] Assignee: Arvin Industries, Inc., Columbus, Ind.

[21] Appl. No.: 739,298

[22] Filed: Nov. 5, 1976

[51] Int. Cl.² .............................................. H04N 7/18
[52] U.S. Cl. ........................... 325/396; 200/DIG. 36; 235/456; 325/308; 335/30; 250/570; 358/86
[58] Field of Search ................. 358/86, 115; 325/308, 325/396, 464; 335/28, 30; 235/61.11 E, 61.12 R; 250/555, 566, 570; 179/100.1 PS; 200/DIG. 36; 340/173 LM; 58/145 R, 152 R

[56] References Cited

U.S. PATENT DOCUMENTS

| | | | |
|---|---|---|---|
| 2,550,784 | 5/1951 | Coupland et al. | 325/396 |
| 3,669,352 | 6/1972 | Zaphiris | 58/152 R |
| 3,686,573 | 8/1972 | McVoy | 325/396 X |

*Primary Examiner*—Robert L. Richardson
*Attorney, Agent, or Firm*—Biebel, French & Nauman

[57] ABSTRACT

A non-duplicative switching arrangement for controlling a video or radio frequency switch is used in a cable television system for controlling the application of a distant station signal to the cable system to eliminate duplication in programming. A clock provides an output indicative of the day and time while a timing means, responsive to the output of the clock provides timing signals. Switching is programmed on a transparent matrix disc which has a plurality of concentric circular rows of matrix positions. Each row corresponds to a day of the week and the matrix positions are aligned radially with respect to the disc in columns which correspond to daily time segments. The light transmitting characteristics of selected ones of the matrix positions are altered impermanently in order to program the switching arrangement. A stepping motor is provided for rotating the disc at predetermined times and an optical reader determines the light transmitting characteristics at each successive matrix position. A motor is provided for actuating the switch into one of its switching states in dependence upon the output from the optical reader. Additional switches may be controlled by providing slave switching control units. Each slave unit is substantially the same as the first control unit with the exception that the slave units rely upon the clock and timing means of the first unit.

8 Claims, 5 Drawing Figures

PROGRAMMABLE NON-DUPLICATION SWITCHING DEVICE

BACKGROUND OF THE INVENTION

The present invention relates to automatic switching devices and, more particularly, to a programmable non-duplicative switching arrangement for use with a cable television system. The cable television industry has grown rapidly as a result of the demand in many television market areas for an increased selection of television programming. A metropolitan area having two local television stations may also have a cable television system providing additional programming from stations in other metropolitan areas. It is inevitable in such a situation that at various periods during the day a local station and a distant station on the cable will be providing the identical programming. In order to prevent dilution of the advertising effectiveness of the local stations, an FCC regulation provides that the distant station signal must be removed from the cable during those periods. Generally, the local station signal will be switched onto the cable in place of the distant station during duplication periods so that the viewer will not need to change the station setting on his receiver in order to view the program.

It will be appreciated that the switching required to prevent duplication must be rather precisely timed and, therefore, it is generally impractical to rely on manual switching. Several automated switching units have been developed in order to provide the desired switching control automatically.

In one prior art device, the non-duplication switching is controlled by a diode matrix arrangement in which diode pins are plugged into a matrix of pin sockets to indicate the time and day of a desired switching operation. The matrix is sequentially scanned and switching is accomplished in response to detection of the diodes. This diode pin arrangement is somewhat expensive and, additionally, the pin sockets and pins may not provide dependable electrical connectors after extended use. Additionally each of the diode pins is relatively expensive and replacement of broken or lost pins can be a substantial maintenance cost.

Another prior art switching control uses a magnetic disc memory for storing switching information. A significant amount of switching information may be stored with each day of the week broken down into one minute switching increments and up to 13 output channels controlled. This device is relatively expensive, however, and requires a trained operator for programming.

A simpler switching arrangement is shown in U.S. Pat. No. 3,686,573, issued Aug. 22, 1972, to McVoy in which business machine cards are used to control switching. Each row on the card corresponds to a particular switch and each column represents a time of day. The cards are passed through a scanner arrangement. The scanner output is used to switch relays and control switches to add or delete distant channels during the programming day. The cards are not particularly simple to program and, additionally, can be scanned for only a day. After the card passes through the reader arrangement, it must be manually reinserted. An additional disadvantage of this switching scale arrangement is that the card is read continuously by the reader. If it is desired to remove the card from the reader and insert a new card, the switches controlling the signal applied to the cable television system will be affected, regardless of when the card is removed from the reader.

U.S. Pat. No. 3,366,731, issued Jan. 30, 1968, to Wallerstein discloses a cable TV system with manual switching to permit certain channels to be deleted and other channels substituted. This system allows portions of the cable TV system to be provided with a different selection of TV channels.

Thus, there exists a need for a simple, inexpensive, reliable and easily programmed automatic switching device capable of switching one or more cable television channels to prevent duplication of television programming.

SUMMARY OF THE INVENTION

A non-duplicative switching arrangement for controlling switching of a two state switch has a clock responsive to a reference signal input for providing an output indicating the time and day, and timing means responsive to the clock output for generating timing signals. A matrix disc has a plurality of concentric circular rows of matrix positions, the matrix positions being aligned radially in columns which correspond to daily time segments. Each circular row of matrix positions corresponds to a day of the week. Means are provided for altering the light transmitting characteristics of the matrix disc at selected ones of the matrix positions. The disc is rotated with respect to an optical reader which senses light transmitting characteristics of the disc at each successive matrix position. Means are provided for setting the switch into one of its switching states in dependence on the output from the reader.

The matrix disc may include a transparent disc member having indicia thereon indicating the matrix positions, the day of the week associated with each circular row and the time of the day associated with at least some of the radially extending columns. Pieces of opaque material having a pressure sensitive adhesive coating may be attached to the disc member at predetermined matrix positions to alter the light transmitting characteristics of the disc member.

One or more slave switching control units may be provided, each of the slave units controlling an associated switch and including a slave matrix disc, a slave optical reader, a disc drive, and a means for moving the associated switch into a desired switching state. All of the slave switching control units are responsive to the clock means and the timing means in the master switching control unit.

Accordingly, it is an object of the present invention to provide an automatic control for a switch in which switching state is determined by the light transmitting characteristics of a rotating disc; to provide such a device in which matrix positions on the disc define switching states during time periods over the span of a week; to provide such a device in which additional control units may be ganged to control additional switches; and to provide such a device in which programming is simply accomplished.

Other objects and advantages will be apparent from the following description, the accompanying drawings and the appended claims.

DETAILED DESCRIPTION OF THE PREFERRED EMBODIMENT

Figure 1:
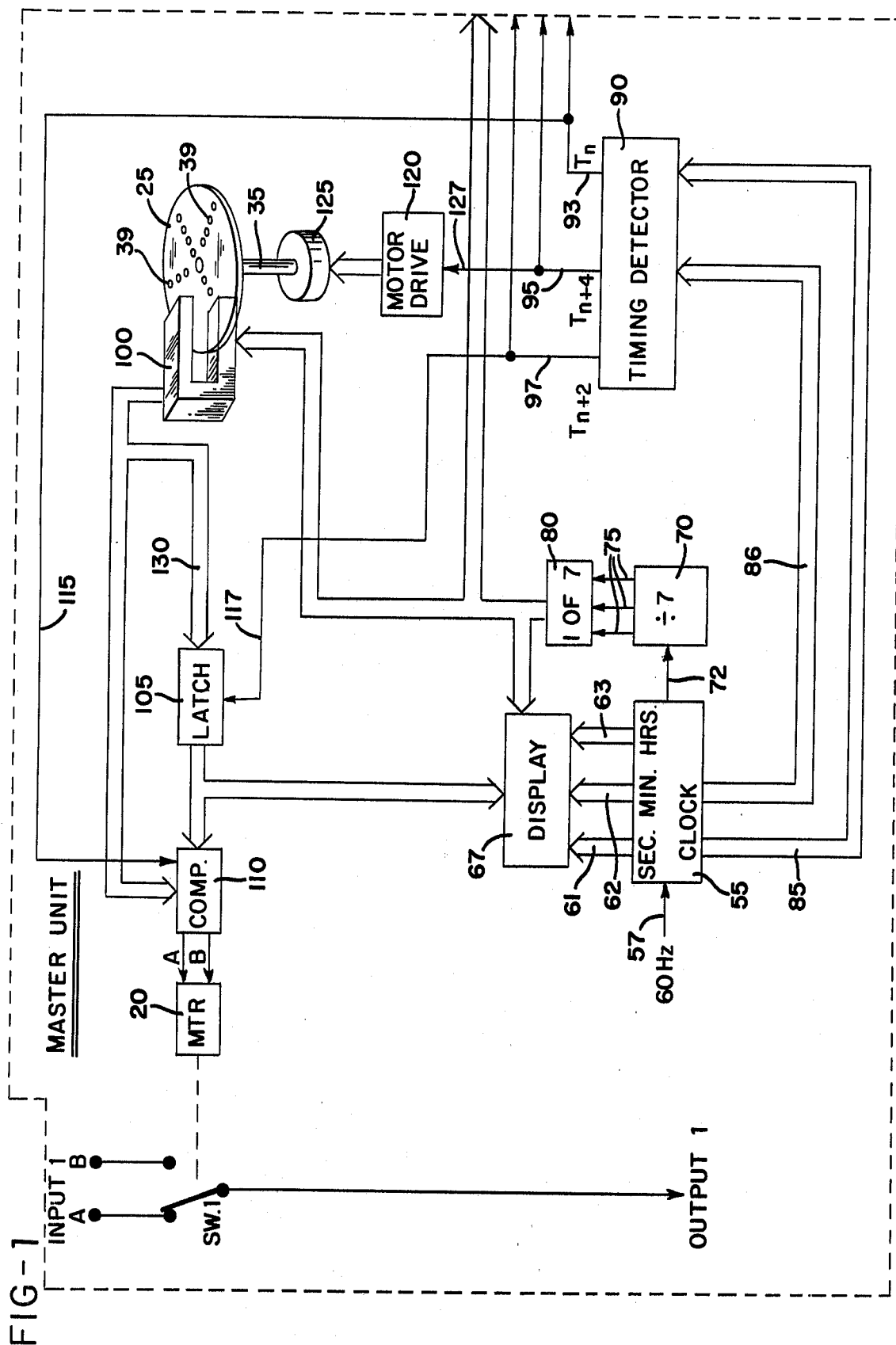
FIG. 1 is a schematic representation of a master unit of the present invention for controlling the switching state of a single switch.

The present invention relates to an automatic control for non-duplication switching in a cable television system. FIG. 1 is a schematic representation showing the overall control for a single switch SW1. As illustrated, switch SW1 is a single pole, double throw switch which connects one of two inputs to its output. When the invention is used in a cable television system, a signal from a distant station, which is to be inserted normally into the cable system, is applied to input A. Switch SW1 normally will apply this signal to the switch output which is connected to circuitry for combining the various distant station signals and insert them into the cable system. During periods of time when identical programming is available on local and distant stations, it is necessary to delete the distant station signal from those on the cable. A local station signal carrying the same programming may be applied to input B of switch SW1 and switched onto the cable in place of the distant station during periods of duplication. When this occurs, the viewer will be able to continue watching the program, uninterrupted, without programming duplication. Switch SW1 may typically be an electro-mechanical switch which is moved into one of two switching states by motor mechanism 20. An exemplary switch useful in switching video signals is shown in U.S. Pat. No. 3,940,584, issued Feb. 24, 1976, to Cauldwell et al and assigned to the assignee of the present invention. A high signal on the A or B inputs to motor mechanism 20 will result in the motor moving switch SW1 into the indicated position.

Figure 2:
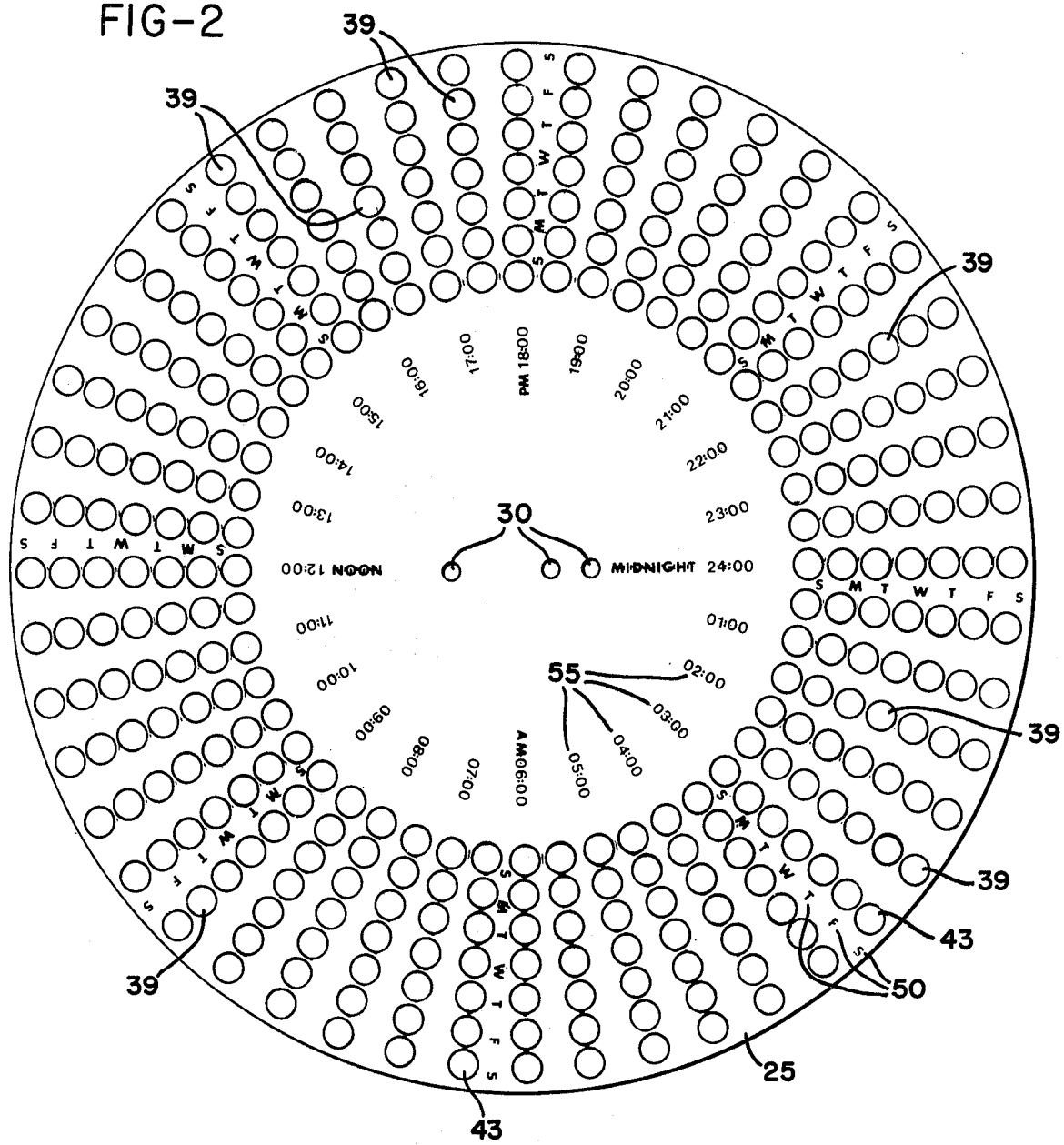
FIG. 2 is a plan view of the matrix disc of the present invention.

Control of the switching state of switch SW1 is accomplished by means of a matrix disc 25, which is shown in greater detail in FIG. 2. The disc member is typically formed of a transparent plastic material. One or more holes 30 provide a means of attachment for the disc member to a means for rotating the disc. In the disc shown in FIG. 2, three holes 30 are provided and are positioned such that they interfit with positioning studs (not shown) on shaft 35 (FIG. 1).

A plurality of circular rows of matrix positions 39 on the disc member are concentric with the axis of rotation. Each matrix position 39 is defined by a matrix position indicia printed on the disc member. In the embodiment of FIG. 2, the matrix position indicia are in the form of circles 43. Individual ones of the matrix positions are aligned as columns extending radially from the axis of rotation of the disc. Day code indicia 50, associated with each of the plurality of circular rows, are provided for indicating the day of the week associated with each of the rows. Time code indicia 55, associated with at least some of the plurality of radially extending columns of matrix positions, are provided to indicate the time segment of the day associated with each column. It will be appreciated that the disc illustrated in FIG. 2 has a matrix position corresponding to each half hour segment for a period of a week.

Means are provided for altering impermanently the light transmitting characteristics of the matrix disc 25 at selected ones of the matrix positions 39. This may advantageously include a plurality of pieces of opaque material having adhesive on one side thereof and sized to be positioned on the disc at selected matrix positions such that the passage of light through the disc at those positions is blocked. Paper circles having a pressure sensitive adhesive coating on one side are readily available from a number of sources and are easily applied to and removed from the disc. Switching of switch SW1 is accomplished in dependence upon the position of such circles as explained more fully below. Alternatively, a grease pencil or other marker may be used to reduce the transparency of the matrix disc at selected positions. These grease marks are easily wiped off with a clean cloth in case the unit needs to be re-programmed.

A clock means including clock 55 receives a 60 Hertz reference signal on input line 57. This reference signal may typically be the line voltage frequency. Clock 55 counts the reference frequency on input 57 and determines therefrom the seconds, minutes, and hours.

Binary coded decimal outputs 61, 62, and 63 indicating the seconds, minutes, and hours, respectively, are applied to a display 67 of standard design. Display 67 may typically be a seven bar digital readout type of display. Clock means further includes counter 70 of conventional design which receives a pulse on line 72 from clock 55 at the end of each 24 hour period and provides a binary output on lines 75 which is indicative of the day of the week. One-of-seven decoder 80 energizes one-of-seven output lines and applies this information to display 67.

The seconds and minutes binary coded decimal information is also applied via lines 85 and 86 to a timing detector circuit 90. Circuit 90 provides outputs on lines 93, 95, and 97 which are used for timing of various circuit operations. The line 93 carries a one second output pulse $T_n$ precisely at the hour and half hour. Two seconds after the hour and half hour, a $T_{n+2}$ pulse of 1 second duration is applied to line 97. Four seconds after the hour and half hour, a $T_{n+4}$ pulse of 1 second duration is applied to line 95.

An optical reader means 100 is provided for reading the matrix disc 25 and determining the light transmitting characteristics at each successive matrix position along a row corresponding to the appropriate day of the week. The output line from the one-of-seven decoder 80 are applied to reader means 100 such that one-of-seven light emitting diodes in the lower portion of reader 100 will be energized and the light transmitting characteristics of only the desired row of matrix positions will, therefore, be determined.

In the upper portion of reader 100, seven photo transistors are provided opposite the seven light emitting diodes. The photo transistors are switched into a conductive state when light from an associated light emitting diode strikes the transistor and switched into a non-conductive state when light is blocked by an appropriately positioned piece of opaque material on the disc 25. The output from the reader, indicative of the programmed switching position, is applied to latch 105 and also to comparator 110. Comparator 110 receives a $T_n$ pulse on line 115 and latch 105 receives a $T_{n+2}$ pulse on line 117. A motor drive 120, of conventional design, causes motor 125 to move 1/48th of a revolution upon the receipt of a pulse $T_{n+4}$ on line 127.

In operation, the master unit of FIG. 1 sets switch SW1 into an A or B position in response to the changes in transparency of the matrix disc 25 at selected matrix positions. The matrix disc 125 is moved into position for reading before the hour or half hour. Precisely on the hour and half hour, the output of reader 100, indicating the desired switching state of switch SW1 for the succeeding half hour period, is compared by comparator 110 with the output from latch 105 which indicates the switching state of switch SW1 for the previous half hour period. This comparison will not occur until receipt of $T_n$ on line 115. At this time, comparator 110 will supply a signal on its A or B output to motor mechanism 20 if switch SW1 is to be switched into the A or B position from the opposite position. If, however, a comparison of the desired switching state with the switching state of the previous half hour indicates that no no switching operation is needed, both the A and B outputs of comparator 110 will remain unenergized. Two seconds after this comparison operation, and the initiation of any necessary switching operations, latch 105 will receive a $T_{n+2}$ pulse on line 117 which will cause the latch 105 to store the output then being received from reader 100. Since comparator 110 will no longer be receiving a $T_n$ pulse, however, its output will be unaffected by the change in the output of latch 105. Finally, four seconds after the hour or half hour, the motor drive 120 will receive a $T_{n+4}$ pulse which will cause motor 125 to rotate disc 25 in preparation for reading the next successive matrix position on the disc. Since comparator 110 will, at that time, not be in receipt of a $T_n$ pulse on line 115, changes in the reader output will not affect the switching state of switch SW1. The circuit of FIG. 1 will then remain in this condition for the balance of the half hour period, until the next $T_n$ pulse is applied to the comparator and the next switching operation is initiated. Since all comparison, switching, and latching is accomplished during the first four seconds of each half hour, the disc 25 may be removed and another disc inserted during the balance of the half hour period without affecting the switching state of switch SW1. Changing the disc 25 is easily accomplished in the device of the present invention and requires only a short period of time.

Figure 3:
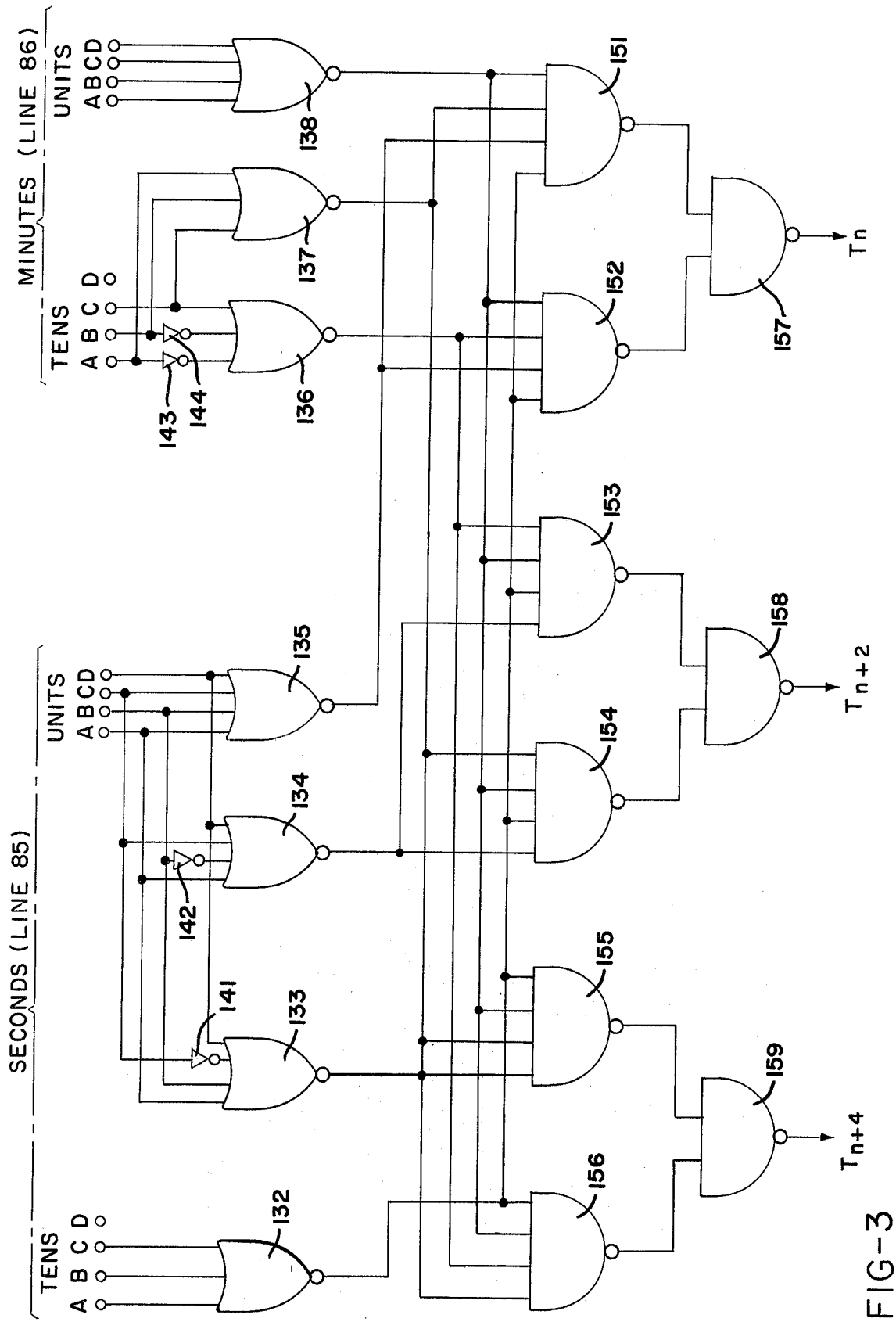
FIG. 3 is a schematic showing the digital logic for generating timing signals for the present invention.

FIG. 3 illustrates a digital logic circuit which may be used as a time detector to generate the $T_n$, $T_{n+2}$, and $T_{n+4}$ pulses. The A, B, C and D bits in each coded decimal digit correspond to the least, second least, third least and most significant bits, respectively. The $T_n$ pulse will be generated when the second and minutes information on lines 85 and 86 indicates 00 minutes, 00 seconds or 30 minutes, 00 seconds. The $T_{n+2}$ pulse will be generated at 00 minutes, 02 seconds and at 30 minutes, 02 seconds. The $T_{n+4}$ pulse will be generated at 00 minutes, 04 seconds and 30 minutes, 04 seconds. It will be appreciated that the outputs from clock 55 will remain the same for one second and that, therefore, the timing pulses from timing detector 90 will each be one second in duration.

NOR gates 132, 133, 134, 135, 136, 137, and 138 receive the various clock outputs, as shown. Each of the NOR gates is of standard design. Inverters 141, 142, 143, and 144 are connected where necessary to provide the detection of the appropriate times.

A number of NAND gates are connected to the NOR gate outputs and provide a "0" output when the desired time indications are provided by clock 55. NAND gate 151 indicates the occurrence of an hour output from the clock and NAND gate 152 indicates the occurrence of a half hour output from clock 55. NAND gate 153 has a "0" output at 2 seconds past the half hour while NAND gate 154 provides a "0" output at 2 seconds past the half hour. NAND gate 155 has a "0" output at 4 seconds past the half hour while NAND gate 156 supplies a "0" output at 4 seconds past the hour. Since NAND gates 151 through 156 normally have "1" outputs, NAND gates 157 through 159 will normally have "0" outputs and will provide a "1" at their respective outputs only when one of the NAND gates connected at their inputs has a "0" output.

Figure 4:
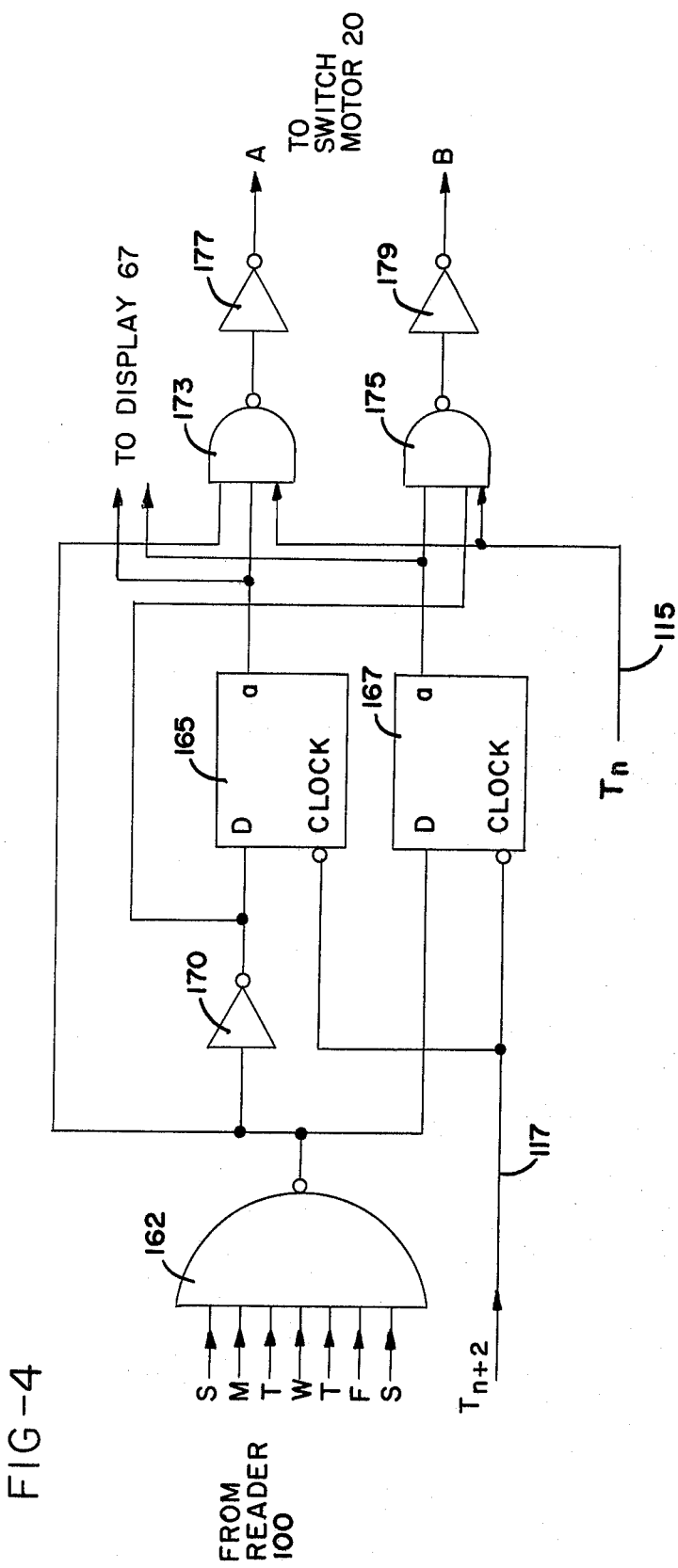
FIG. 4 is a schematic representation of the latch and comparator forming a portion of the present invention.

Referring now to FIG. 4, a portion of the circuit of FIG. 1 is shown in greater detail. A NAND gate 162 receives inputs from reader 100. All of the inputs will be high until light strikes the associated photo transistor, causing it to drop to "0" its associated input to gate 162. The output from gate 162 will therefore be "0" when light passage from the appropriate light omitting diode to its associated photo transistor is blocked. The output from gate 162 will be "1" when the transistor is irradiated and one of the inputs to gate 162 drops to "0". Gate 162 will receive inputs from the reader 100 continuously, but changes in these inputs will not affect the rest of the circuit at times other than $T_n$ and $T_{n+2}$.

Latch 105 (FIG. 1) is comprised of two storage latches 165 and 167. The "a" output of latches 165 and 167 will assume the logic state of the D input, upon receipt of a pulse at the clock input. The output from NAND gate 162 is applied to latch 167 directly and, via inverter 170, to latch 165. The output from gate 162 is likewise applied to NAND gate 173 directly and, in inverted form, to NAND gates 175. Inverters 177 and 179 invert the outputs from gates 173 and 175 and provide the A and B signals for application to motor mechanism 20. The $T_{n+2}$ pulse is applied to latches 165 and 167 via line 117 and the $T_n$ pulse is applied on line 155 to the comparator which is formed of gates 173 and 175.

Operation of the circuit of FIG. 4 is as follows. Assume that during the previous time interval, the passage of light in the reader 100 had been blocked and a "0" output from gate 162 had been provided indicating that the B switching state was desired. Latch 165 would therefore be latched with a "1" output and latch 167 would provide a "0" output. At time $T_n$, "1" inputs would be provided to both NAND gates 173 and 175 on line 115. Since the input to NAND gate 175 from latch 167 will be "0" during this period, however, latch 175 will remain disabled. If a "1" output is now supplied from NAND gate 162, indicating the passage of light through the disc 25 and specifying an A switching state, the third input to NAND gate 173 would receive a "1" input. With all its inputs being "1's", NAND gate 173 would switch to a "0" output and this in turn, would be inverted into a "1" output from the inverter 177. The A output would therefore be "1" with a "0" on the B output, thus indicating the need to move switch SW1 into the A position. This switching action would be accomplished then by motor mechanism 20 (FIG. 1). At time $T_{n+2}$ the latch 105 will store the switching state selected for the half hour interval in preparation for a comparison at the beginning of the following interval. The output of the latch 105 will be applied to display 67 during the balance of the half hour interval.

Figure 5:
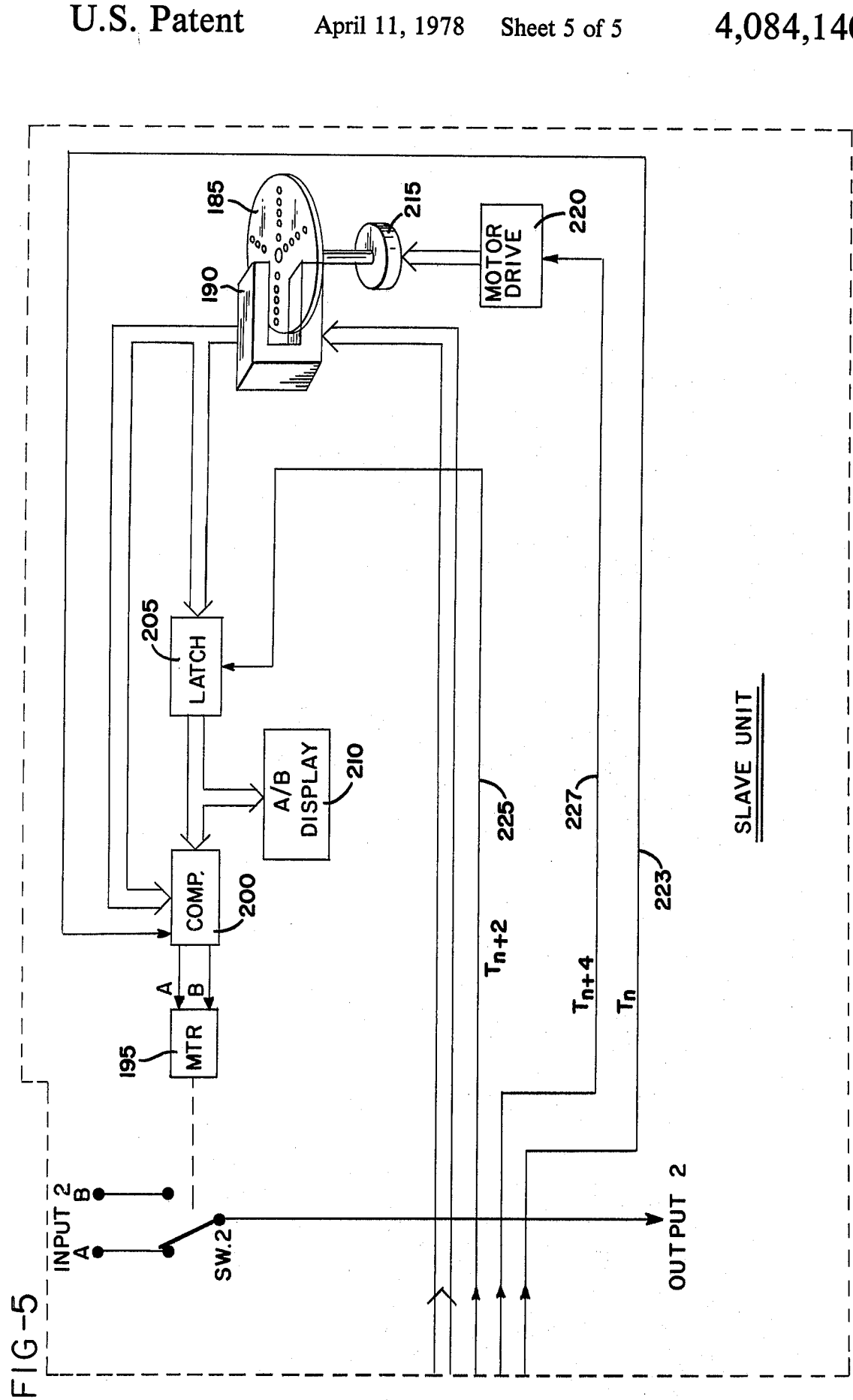
FIG. 5 is a schematic showing a type of slave unit which may be used in the present invention for controlling additional switches.

Referring to FIG. 5, a slave switching control unit is shown which is associated with and controls an additional switch SW2. The slave unit includes a slave matrix disc 185 which is programmed to control the switching state of switch SW2. Slave matrix disc 185 is identical to the matrix disc 25 in the master switching control unit shown in FIG. 1. Slave optical reader 190 senses the transparency of the slave matrix disc 185 at the matrix positions on the disc and is identical to the reader 100 in the master unit. Switch SW2, motor unit 195, comparator 200, and latch 205 are all identical to the corresponding structure discussed previously in regard to the master unit shown in FIG. 1.

Motor unit 195, comparator 200, and latch 205 act as a means for setting the associated switch SW2 into the desired switching state in response to the outputs from the slave optical reader means 190. The slave unit further includes a display 210 to indicate the present switching state of switch SW2. Also included in the slave unit are a disc drive means 215 for moving the slave matrix disc 185 with respect to the slave optical reader 190. Motor drive circuit 220 controls the operation of motor 215.

The primary difference between the slave unit of FIG. 5 and the master unit of FIG. 1 is that the slave unit does not include a clock circuit or circuitry which produces timing signals. Timing signals $T_n$, $T_{n+2}$, $T_{n+4}$, are provided from the master unit for the slave unit on lines 223, 225, and 227, respectively. Additionally, the output of the one of seven decoder 80 in the master unit is used to energize the the desired light emitting diode in the slave optical reader 190. It is apparent that additional slave units may be connected to the master unit with each of the slave units using the timing and clock circuits of the master unit. It is therefore possible to control a number of switches and prevent duplicative programming in regard to a number of distant stations which are placed onto the cable television system.

While the forms of apparatus herein described constitute preferred embodiments of the invention, it is to be understood that the invention is not limited to these precise forms of apparatus and that changes may be made therein without departing from the scope of the invention.

What is claimed is:

1. A non-duplicative switching arrangement for controlling switching of a switch between a first switching state and a second switching state, comprising:

clock means, responsive to a reference signal input, for providing an output indicative of the seconds, minutes, hours and day, timing means responsive to the output of said clock means for generating timing signals, a substantially transparent matrix disc having defined thereon a plurality of concentric circular rows of matrix positions, each row corresponding to a day of the week, said matrix positions aligned radially with respect to said matrix disc in columns corresponding to particular daily time segments, means for altering impermanently the light transmitting characteristics of said substantially transparent matrix disc at selected ones of said matrix positions, means, responsive to said timing means, for rotating said disc at predetermined times, optical reader means, responsive to said clock means, for determining the light transmitting characteristics at each successive matrix position along a row corresponding to the day of the week, and means for actuating said switch into one of its said first and second switching states in dependence upon the output from said optical reader means.

2. The arrangement of claim 1 in which said means for actuating the switch into one of its first and second switching states comprises:

latch means, responsive to said optical reader, for storing the output from said optical reader, comparator means, responsive to said optical reader and to said latch means, for comparing a current output from said optical reader with the previous output from said reader stored by said latch, and motor means for setting the switching state of said switch in response to the output from said comparator means.

3. The arrangement of claim 1 in which said means for actuating the switch comprises:

input means from said optical reader means, for providing a signal indicating the light transmitting characteristics of the selected matrix position, latch means, responsive to said input means and to a timing signal, for storing the output from said input means and providing a corresponding output, comparator means, responsive to said latch means and said input means, for providing an output indicating whether the output from said latch means and the output from said input means are the same prior to said timing signal, and motor means, responsive to the output from said comparator means, for moving the switch into the opposite switching state when said comparator output indicates an inequality of its inputs.

4. The arrangement of claim 1 in which said means for altering impermanently the light transmitting characteristics of said matrix disc comprises a plurality of pieces of substantially opaque material, having adhesive on one side thereof and sized to be positionable on said disc at selected matrix positions such that the passage of light through the disc at said selected positions is thereby blocked.

5. In a control mechanism in a cable television system for automatically controlling the switching state of a two-state electric switch to apply one of two switch inputs to the switch output, one of said switch inputs being a distance station television signal and said switch output being applied to the cable distribution system, a programmable member which is readable by an optical reader, comprising:

a substantially transparent matrix disc with a plurality of matrix positions defined thereon, said positions forming a plurality of radial columns extending outwardly from the center of said disc and defining a plurality of concentric circular rows, each of said rows corresponding to a day of the week and each of said columns corresponding to a time segment of the day, and means for reducing the transparency of selected ones of said matrix positions such that the switching state of said two-state switch will be determined for the corresponding day and time segment.

6. A device for controlling the switching state of a plurality of switches during successive periods of the day, comprising:

a master switching control unit including a programmable transparent matrix disc having a plurality of matrix positions thereon, optical reader means for sensing the transparency of said disc at said plurality of matrix positions, clock means for providing a clock output, timing means providing timing signals in response to said clock output, means for altering the transparency of said disc at selected ones of said plurality of matrix positions, disc driving means for moving said disc with respect to said optical reader means in response to said timing signals, and means for setting one of said plurality of switches into a desired switching state in response to the outputs from said optical reader means and from said timing means, and one or more slave switching control units, each of said slave units associated with and controlling the switching state of one of said plurality of switches, each of said slave units including:

a programmable transparent slave matrix disc having a plurality of matrix positions thereon, slave optical reader means for sensing the transparency of said slave matrix disc at said plurality of matrix positions, disc drive means for moving said slave matrix disc with respect to said slave optical reader means in response to timing signals from said timing means in said master unit, and means for setting the associated one of said plurality of switches into a desired switching state in response to the outputs from said slave optical reader means and from said timing means in said master unit.

7. A matrix disc adapted for periodic rotation about a fixed axis in a cable television switching device, comprising:

a transparent disc member having means thereon providing a mechanism of attachment to a means for rotating the disc, a plurality of circular rows of matrix positions on said disc member concentric with the axis of rotation, each matrix position defined by matrix position indicia printed on said disc member and individual ones of said matrix positions in said plurality of circular rows aligned as columns extending radially from the axis of rotation of said disc member, day code indicia on said disc member associated with each of said plurality of circular rows for indicating the day of the week associated therewith, and time code indicia on said disc member associated with at least some of said plurality of columns of matrix positions to indicate a time segment of the day associated therewith.

8. The matrix disc of claim 7, further comprising one or more pieces of opaque material having an adhesive coating on one side thereof by which said pieces of opaque material are attached to said disc member at one or more predetermined matrix positions such that the light transmitting characteristics of said disc member at said predetermined matrix positions are thereby altered.

* * * * *